US007873395B2

(12) United States Patent
Kim et al.

(10) Patent No.: US 7,873,395 B2
(45) Date of Patent: Jan. 18, 2011

(54) HEADSET

(75) Inventors: Dong-Kyu Kim, Namyangju-si (KR); Beom-Ku Han, Seoul (KR); Chang-Hwan Hwang, Goyang-si (KR)

(73) Assignee: Samsung Electronics Co., Ltd (KR)

( * ) Notice: Subject to any disclaimer, the term of this patent is extended or adjusted under 35 U.S.C. 154(b) by 1020 days.

(21) Appl. No.: 11/592,406

(22) Filed: Nov. 3, 2006

(65) Prior Publication Data

US 2008/0107301 A1 May 8, 2008

(30) Foreign Application Priority Data

Nov. 3, 2005 (KR) ...................... 10-2005-0104875

(51) Int. Cl.
*H04B 1/00* (2006.01)

(52) U.S. Cl. ...................... 455/575.2; 379/430; 381/370

(58) Field of Classification Search .............. 455/575.2; 379/433.13, 430; 381/370, 74; 200/341, 200/520

See application file for complete search history.

(56) References Cited

U.S. PATENT DOCUMENTS 6,754,361 B1 * 6/2004 Hall et al. .................. 381/370
7,031,475 B2 * 4/2006 Kuraoka et al. ............... 381/74
7,046,799 B2 * 5/2006 Ma ........................ 379/433.13
7,130,419 B2 * 10/2006 Bodley et al. ............... 379/430
7,133,708 B2 * 11/2006 Park et al. ................ 455/575.2
2004/0132509 A1 * 7/2004 Glezerman ............... 455/575.2
2004/0157581 A1 * 8/2004 Park et al. .................. 455/344
2005/0257662 A1 * 11/2005 Lin .......................... 84/385 R
2006/0135223 A1 * 6/2006 Kim ........................ 455/575.2

FOREIGN PATENT DOCUMENTS

WO WO 2005081275 A1 * 9/2005

* cited by examiner

*Primary Examiner*—Edward Urban
*Assistant Examiner*—Golam Sorowar
(74) *Attorney, Agent, or Firm*—The Farrell Law Firm, LLP

(57) ABSTRACT

A headset worn is provided to be on an ear in such a manner that a speaker is adhered to the ear. The headset includes a headset body; a hook unit for adhering and fixing the headset body to a user's ear part; a key positioned at a part of the headset body such that its key top protrudes; and a touch region having elasticity, and provided to maintain a distance from the key while facing the key, wherein, as the touch region is pressed, the key is pressed and enabled at the same time.

4 Claims, 4 Drawing Sheets

HEADSET

PRIORITY

This application claims priority under 35 U.S.C. §119 to an application entitled "Headset" filed in the Korean Intellectual Property Office on Nov. 3, 2005 and assigned Serial No. 2005-104875, the contents of which are incorporated herein by reference.

BACKGROUND OF THE INVENTION

1. Field of the Invention

The present invention relates generally to a portable terminal such as a digital multimedia broadcasting (DMB) phone, a game phone, a chatting phone, a camera phone, an MPEG-1 Audio Layer 3 (MP3) phone, a cellular phone, personal communications services (PCS), personal digital assistants (PDA), and a hand held phone (HHP), and in particular, to an ear wearable type headset which can communicate with a portable terminal using a local area wireless communication device such as a Bluetooth™ device.

2. Description of the Related Art

In general, a portable communication device refers to an electronic device carried by a user for performing wireless communication with a called party. The current trend of the portable communication device is towards further miniaturization, slimming, gripping, and lightweightness for improved portability, and improved multimedia service with a greater variety of functions. In particular, a future portable terminal will be increasingly used for miniaturization, lightweighting, multifunction, and multipurpose, and will be changed and adapted to Various multimedia environments or Internet environment. Additionally, a portable terminal is becoming recognized as a necessity that has to be carried at all times.

The conventional portable communication device is changing into a structure for data communication based on high speed in addition to a voice communication function. In other words, as consumer's desire increases, a service of high-speed data communication will be provided using a wireless communication technology.

Meantime, a local area wireless communication device, such as a device with a Bluetooth™ module, is employed in a headset and is becoming popular. The headset is worn on a specific portion of a human body, for example, on a head and ears to enable communication with a called party using a local area communication technology. In general, a headset, a wireless portable device worn on the ear and used, includes a headset body, and a hook unit for wearing the headset body on the ear.

However, the conventional wireless headset has a disadvantage in that, when it is worn on the ear, the ear wearing state is not stably supported and in addition, in an unstable wearing state, a press operation of a key provided at the headset body is also unseen with eyes and therefore, the key press operation is inconvenient.

SUMMARY OF THE INVENTION

It is, therefore, an object of the present invention to provide a headset in which a user can conveniently press a key headset worn on a user's ear.

It is another object of the present invention to provide a headset in which, since a joint hook unit rotates in all directions, ear wearing is convenient and is more stable.

It is a further object of the present invention to provide a headset provided with a plurality of joints such that it can actively adapt to all user wearing states.

To achieve the above and other objects, there is provided a headset worn on an ear in such a manner that a speaker is adhered to the ear. The headset includes a headset body; a hook unit for adhering and fixing the headset body to a user's ear part; a key positioned at a part of the headset body such that its key top is protruded; and a touch region having elasticity, and provided to maintain a distance from the key while facing the key, wherein, as the touch region is pressed, the key is pressed and enabled at the same time.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
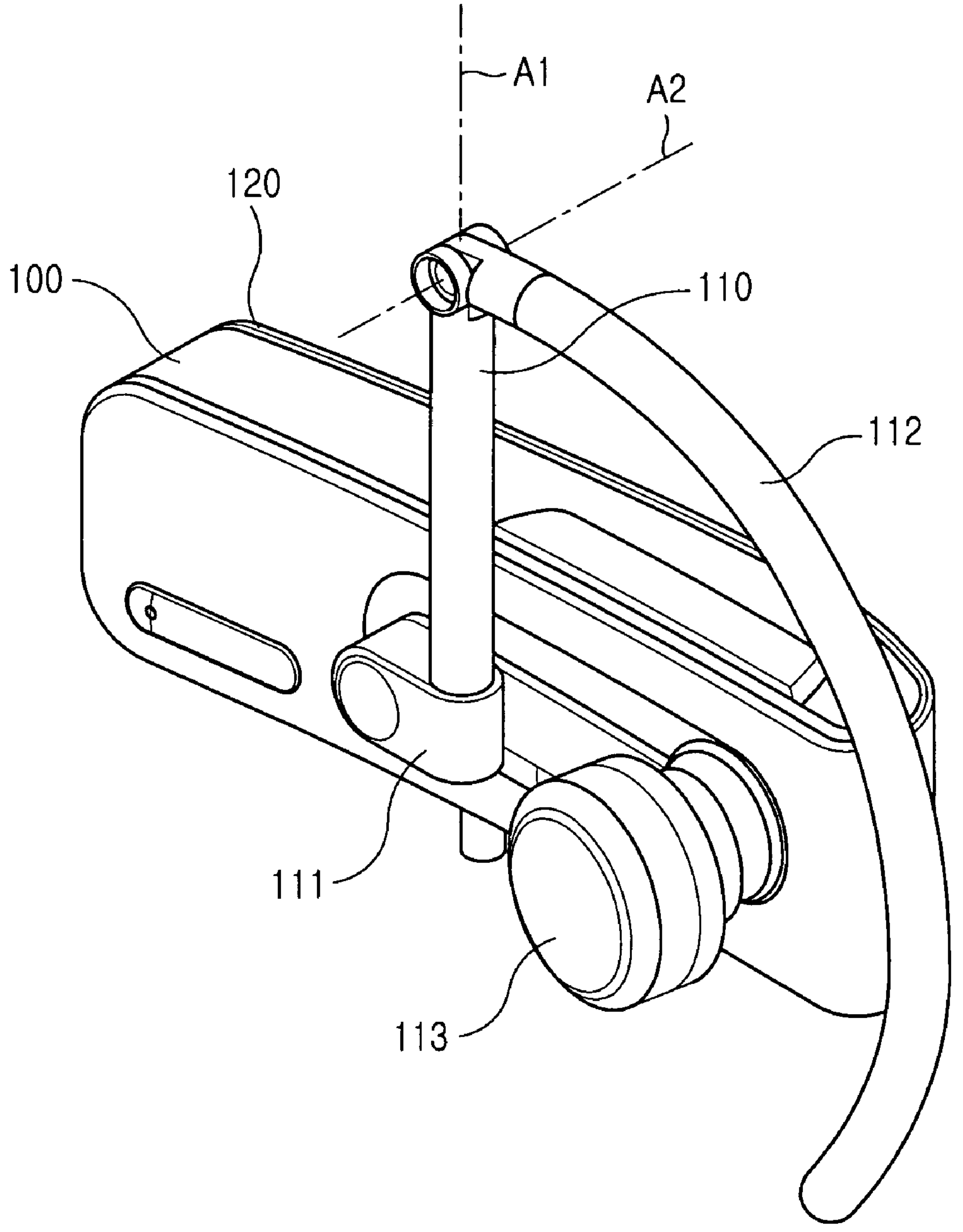
FIG. 1 is a perspective view illustrating a headset according to a first embodiment of the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
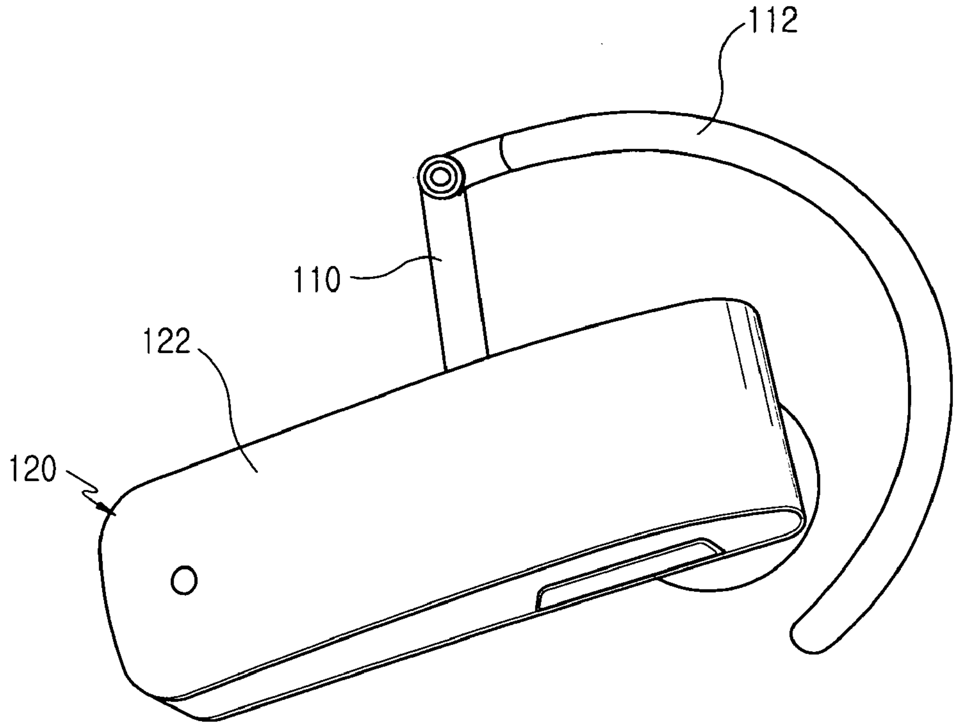
FIG. 2 is a perspective view illustrating a touch region of a headset according to the first embodiment of the present invention.
Figure 3:
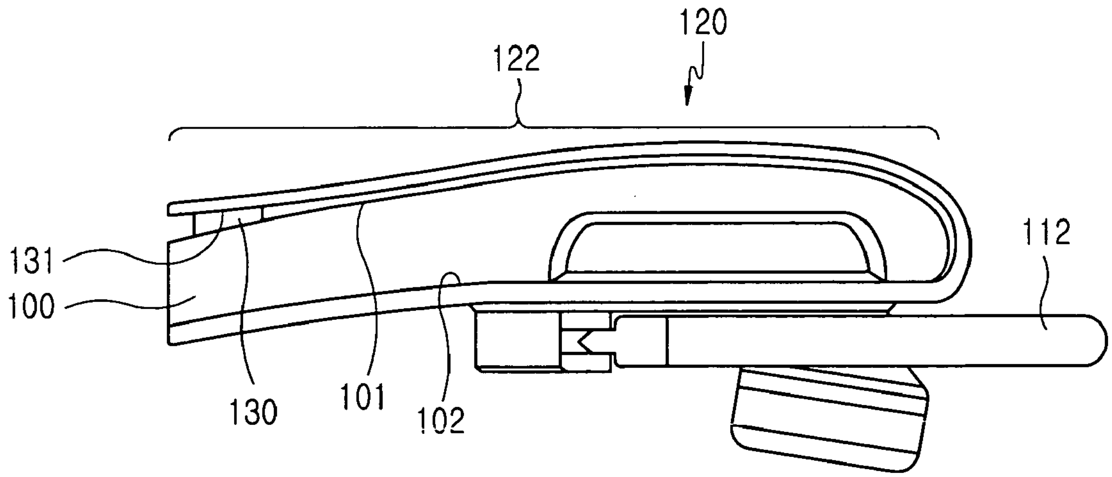
FIG. 3 is a side view illustrating a headset according to the first embodiment of the present invention.

As shown in FIGS. 1 to 3, it should be noted that a headset according to a first embodiment of the present invention refers to a wireless device in which it is convenient to wear and key press operation is convenient. The inventive headset includes a headset body 100, a hinge member 110, a hook unit 112, a key 130, and a cover 120. The headset body 100 is extended in the length direction and is elongated in shape. When the headset is worn on an ear, the headset body 100 is worn to suspend from the ear such that its front region directs to a lower side, in detail, to the ground, that its upper surface 101 directs outside of the ear, and that its lower surface 102 directs to the ear. The hinge member 110 and the hook unit 112 connect to the headset body 100 such that they can rotate with respect to first and second hinge axes (A1, A2), respectively. The hinge member 110 and the hook unit 112 are connected like human joints such that the headset body 100 is stably worn on the ear.

The hinge member 110 is connected to the lower surface 102 of the headset body 100 in the vertical direction of the length direction or in the inclination direction close to the vertical direction, and is rotated with respect to the first hinge axis (A1) having the vertical direction or the inclination direction such that the headset body 100 sticks to and worn on the ear.

The hook unit 112 having a curved and hook shape is combined to an end of the hinge member 110 and is rotated with respect to the second hinge axis (A2) orthogonally with the first hinge axis (A1), thereby stably supporting an ear wearing state of the headset body 100. The hook unit 112 can be formed of elastic and soft material, such as, soft rubber or silicon, and can be covered and constructed by the soft material. The hook unit 112 is constructed longer than the hinge member 110, and supports the ear wearing state with more stability.

The key 130 is mounted on the front region of the headset body 100, and is pressed depending on press of the cover 120. A key top 131 of the key 130 faces closely to the cover 120. The key 130 is protruded from and disposed at an upper and front region of the headset body 100 at a predetermined thickness. An occupation region of the key 130 is less than the front region of the headset body 100. This will be described later, but the cover 120 is formed of hard material and the key 130 is expanded at its press region using the cover 120.

The cover 120 covers only the upper and lower surfaces 101 and 102 of the headset body 100. This is for a cover elasticity to be described later. The cover elasticity is retained and enabled in the direction of going away from each other. This is, in particular, because the cover 120 is manufactured by bending a band shaped metal plate. The cover 120 is installed such that its one surface maintains a distance from the upper surface 101 or the key top 131, and that the other surface is adhered and fixed to the lower surface 102. In detail, the cover 120 covers the upper surface 101 and a surface, which directs to the outside of the ear, of the headset body 100 and is spaced apart by a predetermined distance. The cover 120 includes a touch region 122 having elasticity for maintaining an adherence state to the key top 131. The touch region 122 matches with the upper surface 101 of the headset body. When the touch region 122 is pressed, the key 130 is also pressed and enabled. The touch region 122 has a wider area than the key top 131 because, when the headset is worn on the ear, it is inconvenient for a user to exactly press the key 130 in a state where it is out of sight. In addition, the touch region 122 is provided using the cover formed of hard material, preferably, elastic metal and accordingly, the wider touch region 122 is provided to the user. The cover 120 is formed of metal. Accordingly, when the touch region 122 is pressed, the key 130 is also pressed at the same time.

In FIG. 1, reference numeral 113 denotes a speaker. The speaker is worn inside of the ear, and protrudes and is wrapped with cloth. In addition, the headset according to the first embodiment of the present invention can be used in a pair.

Figure 4:
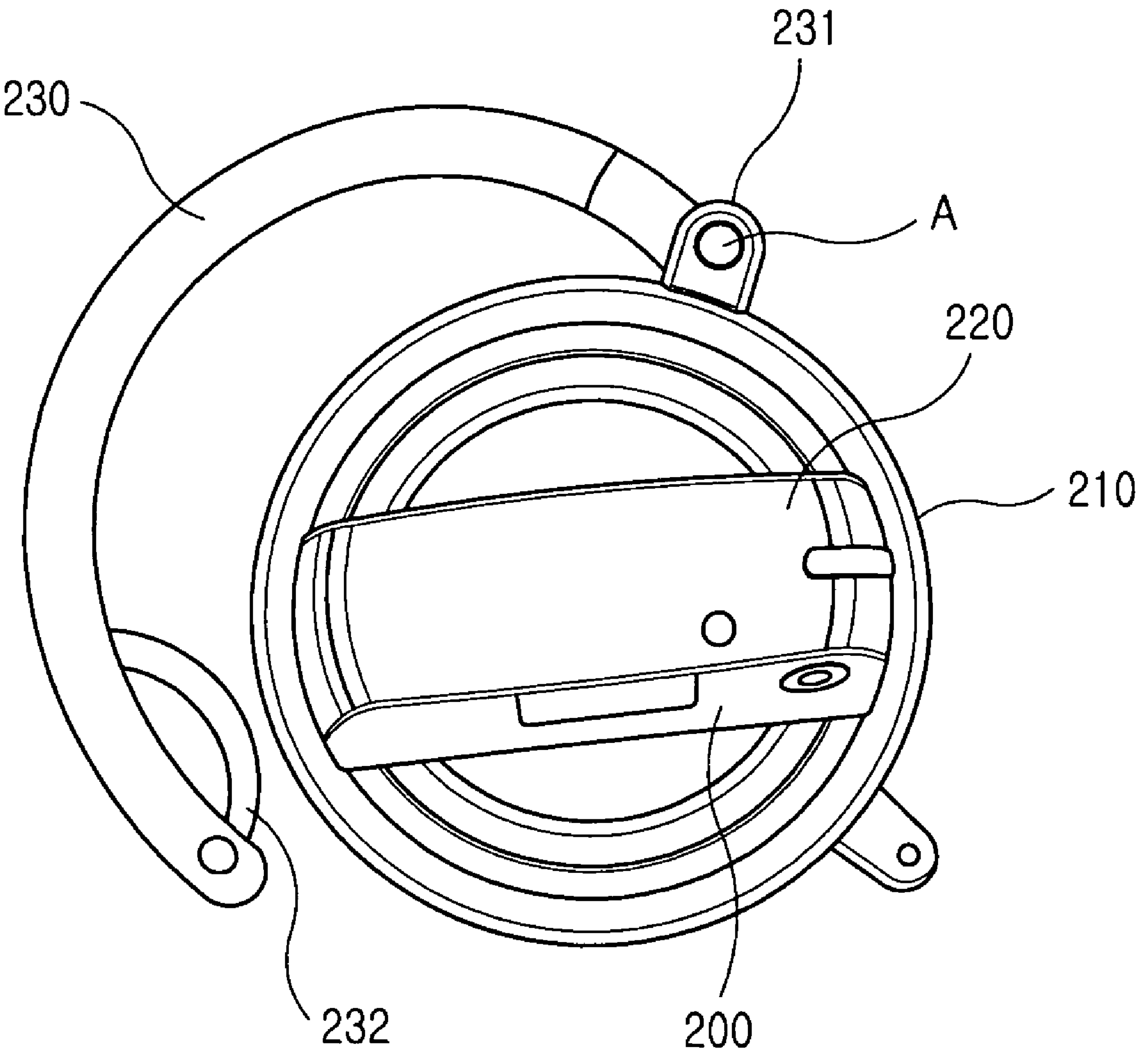
FIG. 4 is a front view illustrating a headset according to a second embodiment of the present invention.
Figure 5:
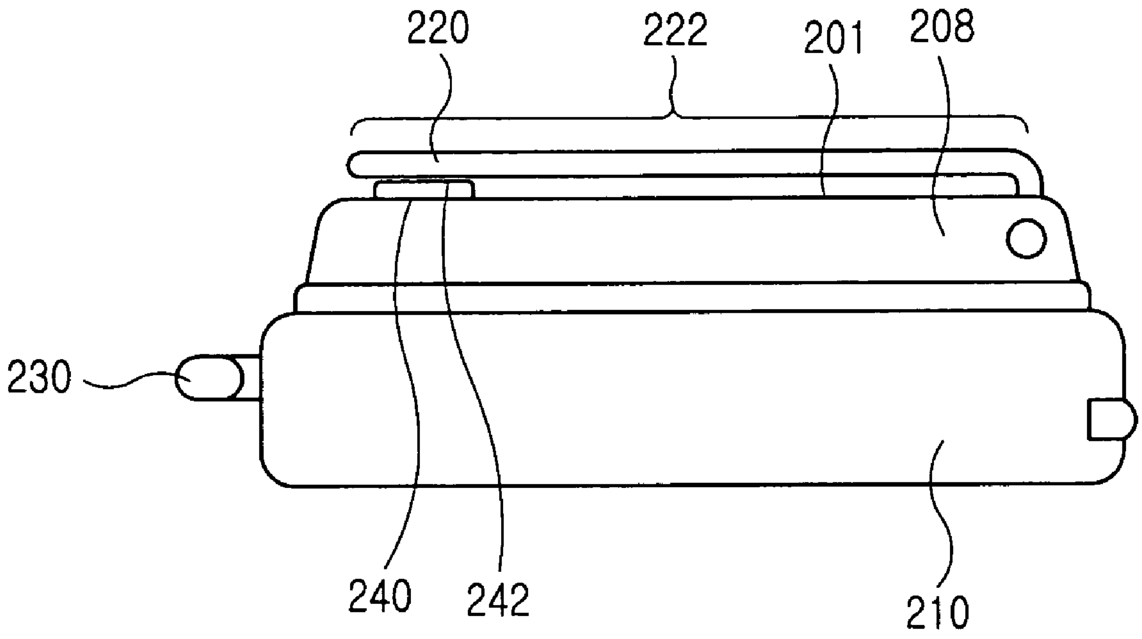
FIG. 5 is a side view illustrating a touch region of a headset according to the second embodiment of the present invention.

Referring to FIGS. 4 and 5, a construction of a headset according to a second embodiment of the present invention will be in detail described. As shown in FIGS. 4 and 5, the headset according to a second embodiment of the present invention includes an ear contact part 210 including a speaker (not shown); a headset body 200 disposed outside of the ear contact part 210; a hook unit 230 provided in the headset body 200, and adhering to and concurrently, supporting the ear; a key 240 (shown in FIG. 5) provided at the headset body 200; and a cover 220 having elasticity for maintaining a distance from the key 240 and being in the direction of going away from the a key top 242 of the key 240. The ear contact part 210 is wrapped with a sponge, thereby allowing its contact with the ear to be felt good. The hook unit 230 connects and rotates by the hinge unit 231 with respect to a hinge axis (A), and is provided to have elasticity. The hook unit 230 can also be formed of soft material, or its circumference surface can be formed of and wrapped with soft material. An auxiliary hook unit 232 is provided at an end of the hook unit 230 to support a wearing state. The soft material can be rubber or silicon.

As shown in FIG. 5, the key 240 is installed to maintain a distance from an upper surface 201 of the headset body, and faces with an area sufficient to associate with the upper surface 201 of the headset body. The cover 220 is formed of elastic and plastic material, and maintains a distance from the key top 242. The cover 220 includes a touch region 222 matching with the upper surface 201 of the headset body. When the user presses the touch region 222, the key top 242 protruded at a predetermined thickness from the upper surface 201 of the headset body is pressed and the key 240 is enabled. Since the touch region 222 has a wider area than the key top 242, it is very convenient for the user to press the unseen key 240 with the headset worn on the ear.

As described above, the present invention achieves an advantage in that it is convenient to adhere and wear the headset on the ear, and it is very convenient to, when the headset is worn on the ear, press the unseen key installed on the headset.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A headset worn on an ear in such a manner that a speaker is adhered to the ear, the headset comprising:

a headset body;

a hook unit for adhering and fixing the headset body to a part of a user's ear;

a key protruding at a predetermined thickness from an upper surface of the headset body; and a touch region having elasticity, and provided to maintain a distance from the upper surface of the headset body, wherein, as the touch region is pressed, a top of the protruding key is pressed and the key is enabled.

2. The headset of claim 1, wherein the cover is formed of metal and is provided to maintain a distance from the key top and an upper surface of the headset body, and the elasticity is retained and enabled in a direction away from the key top.

3. The headset of claim 1, wherein a hook unit has a curved hook shape, and is formed of an elastic and soft material or wrapped by soft material.

4. The headset of claim 1, further comprising:

a hinge member on a lower surface of the headset body in a vertical direction of an extension direction of the headset body, and rotating with respect to a first hinge axis in one of a vertical direction or an inclination direction such that the headset is adhered to and worn on the ear;

wherein the hook unit is hinged to the hinge member, and stably supporting an ear wearing state with respect to a second hinge axis orthogonal with the first hinge axis.

* * * * *